Oct. 24, 1944.    L. J. HIBBARD    2,361,201
LOCOMOTIVE CONTROL SYSTEM
Filed Nov. 19, 1942    3 Sheets-Sheet 2

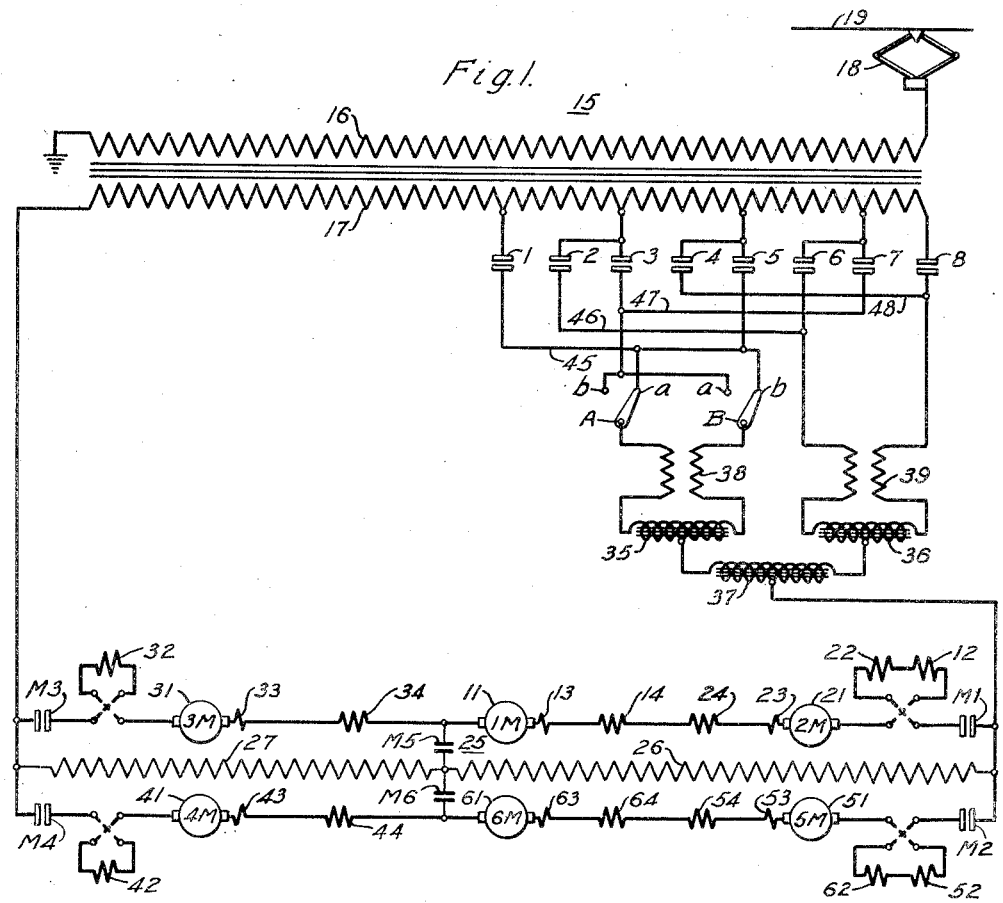

WITNESSES:
INVENTOR
Lloyd J. Hibbard.
ATTORNEY

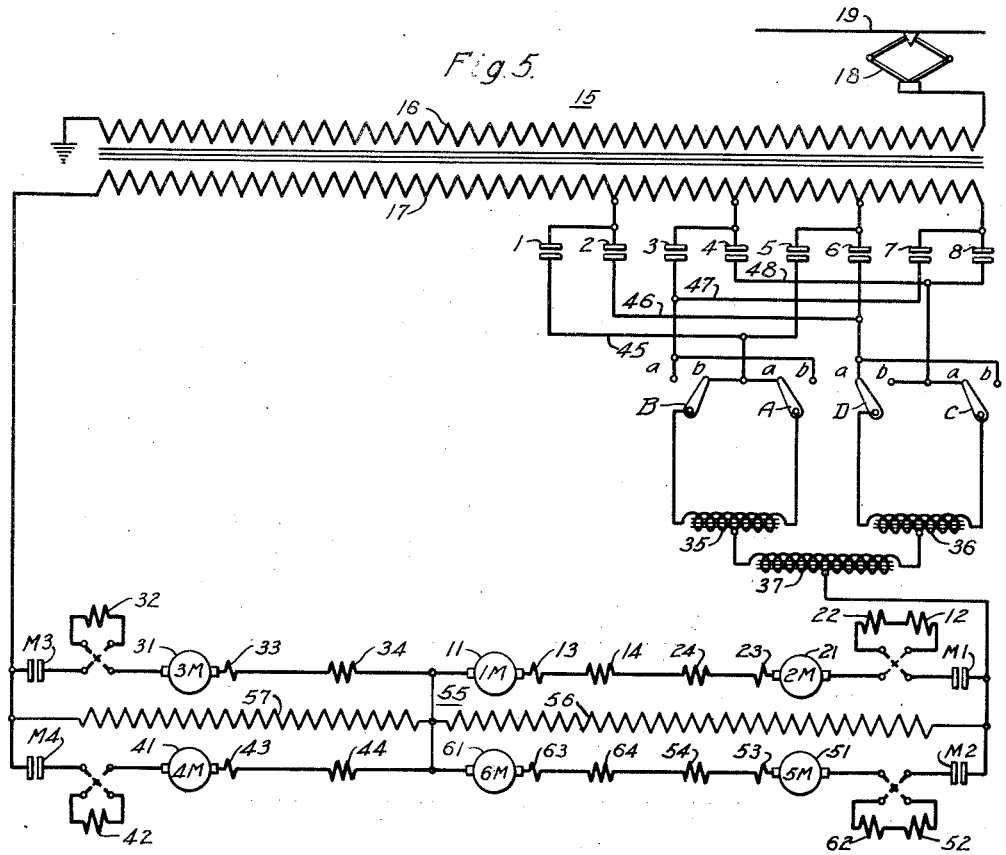

Patented Oct. 24, 1944

2,361,201

UNITED STATES PATENT OFFICE 2,361,201

LOCOMOTIVE CONTROL SYSTEM

Lloyd J. Hibbard, Forest Hills, Pa., assignor to Westinghouse Electric & Manufacturing Company, East Pittsburgh, Pa., a corporation of Pennsylvania Application November 19, 1942, Serial No. 466,139

11 Claims. (Cl. 172—179)

My invention relates, generally, to control systems and, more particularly, to systems for controlling the operation of electrically propelled locomotives and vehicles.

It is believed that severe slippage of the driving wheels of electric locomotives causes traction motor troubles as well as broken driving axles and armature shafts. Furthermore, the effective adhesion of an electric locomotive can be increased and the amount of slipping reduced by increasing the number of accelerating steps and by the application of anti-slip preventive coils or balancing transformers. In my copending applications Serial Nos. 466,137 and 466,138, filed November 19, 1942, numerous schemes are described for controlling the slipping of traction motors which are connected in series or in series-parallel circuit relation.

An object of the present invention is to provide additional schemes for controlling the slipping of the traction motors of electric locomotives.

A further object of my invention is to increase the number of accelerating steps in a tap-changing system without materially increasing the amount of switching equipment required.

Another object of my invention is to provide for the application of anti-slip preventive coils or balancing transformers to electric locomotives having an odd number of driving axles.

Other objects of my invention will be explained fully hereinafter or will be apparent to those skilled in the art.

According to the present invention, the voltage applied to the traction motors of a locomotive is controlled by means of a main transformer, a plurality of tap-changing switches, three preventive coils and auxiliary switches for so connecting the preventive coils to the tap-changing switches that the number of accelerating steps is increased without increasing the number of tap-changing switches. A balancing transformer or anti-slip preventive coils is connected across series-connected motors to insure a definite division of the main transformer tap voltage between the motors, thereby controlling the motor speed in case of wheel slippage.

For a fuller understanding of the nature and objects of my invention, reference may be had to the following detailed description, taken in conjunction with the accompanying drawings, in which:

Figure 1 is a schematic diagram of a control system embodying my invention;

Fig. 2 is a chart showing the sequence of operation of the switches illustrated in Fig. 1;

Fig. 5 is a schematic diagram of another modification of the invention; and

Fig. 6 is a sequence chart for the switches illustrated in Fig. 5.

Figures 3, 4:
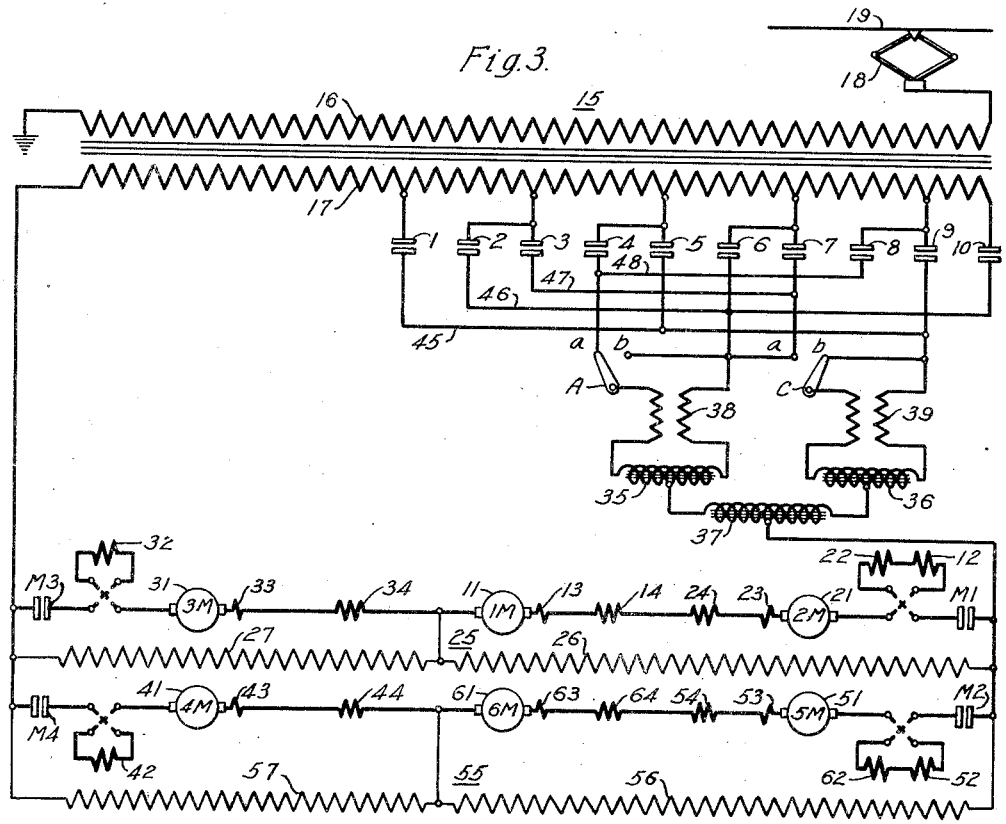
Fig. 3 is a schematic diagram of a modified form of the invention.
Fig. 4 is a sequence chart for the switches illustrated in Fig. 3.

Referring to the drawings and particularly to Fig. 1, the system shown therein comprises traction motors 1M, 2M and 3M which are connected in series-circuit relation and similar motors 4M, 5M and 6M also connected in series-circuit relation. The two groups of motors are connected in parallel-circuit relation across the power source, thereby forming the well known series-parallel arrangement commonly used on railway locomotives.

The motor 1M is provided with an armature winding 11, a main field winding 12, a compensating field winding 13 and a commutating field winding 14. The motor 2M is provided with an armature winding 21, a main field winding 22, a compensating field winding 23 and a commutating field winding 24. Likewise, the motor 3M is provided with armature winding 31, a main field winding 32, a compensating field winding 33 and a commutating field winding 34. The motor 4M is provided with an armature winding 41, a main field winding 42, a compensating field winding 43 and a commutating field winding 44. The motor 5M is provided with an armature winding 51, a main field winding 52, a compensating field winding 53 and a commutating field winding 54. The motor 6M is provided with an armature winding 61, a main field winding 62, a compensating field winding 63 and a commutating field winding 64. Disconnecting switches M1, M2, M3, M4, M5 and M6 are provided for disconnecting either group of motors from the power source.

The power for operating the traction motors may be supplied through a main transformer 15 having a primary winding 16 and a secondary winding 17. The primary winding 16 is energized through a current collecting device 18 which engages a power conductor 19. The power conductor 19 may be energized from a power generating station or other suitable source of electric power.

As explained hereinbefore, it has been found necessary to provide some means for controlling the slipping of the axles driven by the motors when two or more motors are connected in series-circuit relation. When one axle starts slipping the voltage of the motor which drives that axle increases, thereby robbing the voltage from the other motors which are connected in series with the slipping motor and if the slipping is not controlled the action becomes cumulative and the slipping motor may attain a dangerous speed.

As described in my aforesaid copending applications, the wheel slippage may be controlled by providing a balancing transformer or anti-slip preventive coil comprising a pair of windings which are wound in mutually inductive relation. The windings of the balancing transformer are so connected across the motors that the voltage and hence the speed of the slipping motor are prevented from rising to dangerous values.

As shown in Fig. 1, such a balancing transformer 25 having a pair of windings 26 and 27 is provided in the present system. In the present system the motors 1M and 2M are both geared to the #1 axle of the locomotive. The motors 3M and 4M are geared to the #2 axle and the motors 5M and 6M are geared to the #3 axle. Therefore, the motors 1M and 2M must always operate at the same speed. Likewise, the motors 3M and 4M will always operate at the same speed and the motors 5M and 6M will always operate at the same speed.

Accordingly, the winding 26 of the balancing transformer 25 is connected in parallel-circuit relation to the motors 1M and 2M and also the motors 5M and 6M. The winding 27 is connected in parallel-circuit relation to the motors 3M and 4M. Since the winding 26 is connected across two motors which are connected in series-circuit relation while the winding 27 is connected across only one motor, the voltage across the winding 26 will normally be twice the voltage across the winding 27, and, therefore, the winding 26 should contain twice as many turns as the winding 27.

As explained in my aforesaid copending applications, if one pair of motor, for example, the motors 1M and 2M starts to slip, the increase in the voltage of these motors causes a current to flow through the winding 26 of the balancing transformer 25. This current causes a proportional current to flow through the winding 27, which, in turn, causes a circulating current to flow through the motors 3M and 4M, thereby increasing the current and the tractive effort of the motors 3M and 4M relative to the motors 1M and 2M. In this manner the tractive effort of the slipping motors is decreased and the tractive effort of the non-slipping motor is increased, thereby tending to stop the slipping condition.

Likewise, in the event that the motors 3M and 4M start to slip, current flows through the winding 27 which causes a proportional current to flow through the winding 26, thereby causing a circulating current to flow through the motors 1M, 2M, 5M and 6M which increases the current and tractive effort of these motors relative to the motors 3M and 4M. In this manner the motors for a locomotive having an odd number of driving axles may be so connected to the balancing transformer that slipping of any motor is properly controlled.

As explained hereinbefore, the effective adhesion of an electric locomotive can be increased and the amount of slipping of the driving wheels reduced by increasing the number of accelerating steps. With a view toward increasing the number of accelerating steps without materially increasing the amount of equipment required in the present system, the acceleration of the locomotive is controlled by varying the voltage applied to the traction motor circuit by means of eight main tap switches numbered from 1 to 8, inclusive, and three preventive coils 35, 36 and 37. Additional reactors 38 and 39 may be provided in the circuits for the preventive coils 35 and 36, respectively, to reduce the peak values of the surging current resulting from the switching operations.

As shown, the tap switches 1 and 5 are connected to a common bus 45. The tap switches 2 and 6 are connected to a common bus 46 and the switches 3 and 7 are connected to a bus 47. Likewise, the switches 4 and 8 are connected to a common bus 48. The preventive coil 37 is connected across the midpoints of the preventive coils 35 and 36.

In the present scheme a pair of single-pole double-throw auxiliary switches A and B is provided for changing the connections for the preventive coil 35 back and forth between the busses 45 and 47 in order to increase the number of accelerating steps or notches obtained with a predetermined number of main tap switches. Thus, both terminals of the preventive coil 35 may be connected to either the bus 45 or the bus 47 or each terminal of the preventive coil may be connected to either one of these busses.

In order that the operation of the tap-changing and auxiliary switches may be more clearly understood, reference may be had to the sequence chart shown in Fig. 2 which illustrates the sequence of operation of the foregoing switches. As shown in the sequence chart the main tap switch 1 is closed at the start of the notching operation and the auxiliary switch A is in position $a$ and the auxiliary switch B is in position $b$. Also only the disconnecting switches M1, M3 and M5 are closed, thereby connecting only one group of motors to the power source. Thus, both terminals of the preventive coil 35 are connected to the bus 45 which is connected to the secondary winding 17 of the main transformer through the tap switch 1 and the voltage applied to the traction motors is equal to the voltage of the tap to which the switch 1 is connected minus the reactive drop in the main preventive coil 37, which is unbalanced at this time since only one of its terminals is energized.

On step number 2 the only change in the switching connections is the closing of the disconnecting switches M2, M4 and M6 to connect the motors 4M, 5M and 6M to the power source.

On step number 3 the main tap switch 3 is closed and the auxiliary switch B is actuated to position $a$. Thus, the preventive coil 35 is connected across the busses 45 and 47 and the voltage applied to the traction motors is equal to the voltage midway between the taps to which the switch 1 and 3 are connected minus the reactive voltage drop in the preventive coil 37 which is still unbalanced.

On step number 4 the main tap switch number 1 is opened and the auxiliary switch A is actuated to position $b$. Thus, both terminals of the preventive coil 35 are connected to the bus 47 and the voltage applied to the motors is equal to the voltage of the tap to which the switch 3 is connected minus the reactive drop of the preventive coil 37.

On step number 5 the main tap switches 1, 2, 3 and 4 are closed and the auxiliary switches A and B are both in position $a$. The preventive coil 35 is connected across the busses 45 and 47 and the preventive coil 36 is now connected across the busses 46 and 48. Thus, the voltage applied to the motors is equal to the voltage to which the tap switch 3 is connected since both terminals of the preventive coil 37 are now energized, thereby balancing out the reactive drop of the windings of this coil and increasing the motor voltage by an amount equal to the reactive drop of these windings.

On step 5i the auxiliary switch A is actuated to position b. Both terminals of the preventive coil 35 are now connected to the tap of the main transformer to which the switch 3 is connected. Thus, the voltage applied to the one terminal of the preventive coil 37 is equal to the voltage of this tap. Since the preventive coil 36 is connected across the taps to which the switches 2 and 4 are connected, the voltage applied to the other terminal of the preventive coil 37 is equal to the voltage midway between the taps to which the switches 2 and 4 are connected. The resultant voltage applied to the motor is, therefore, increased by an amount equal to one-fourth of the voltage between the two main taps on the transformer to which the switches 2 and 4 are connected.

On step 6 the main tap switch 1 is opened and the switch 5 is closed and the auxiliary switch A is actuated to position a. Thus, the preventive coil 35 is connected across the taps on the main transformer to which the switches 3 and 5 are connected. The preventive coil 36 is also connected across these same taps since the switches 2 and 4 are connected to the same taps on the main transformer as the switches 3 and 5. Accordingly, the preventive coil 37 is connected across these same taps on the main transformer and the voltage applied to the motors is equal to the voltage midway between these taps.

On step 6i the auxiliary switch B is in position b. Thus, both terminals of the preventive coil 35 are connected to the tap on the main transformer to which the switch 5 is connected and the voltage applied to the one terminal of the preventive coil 37 is equal to the voltage of this tap. The other terminal of the preventive coil 37 is in effect connected to a point midway between the taps to which the switches 3 and 5 are connected and the resultant voltage on the motors is equal to that of a tap located three-quarters of the distance between the taps to which the switches 3 and 5 are connected. The acceleration of the motors may be continued by operating the main tap switches and the auxiliary switches in the order shown in the sequence chart.

In this manner it will be seen that the voltage applied to the motors is increased in intermediate steps by the operation of the auxiliary switches A and B between the operation of the main tap switches, thereby increasing the total number of notches or steps obtained without increasing the number of main tap switches. Accordingly, the increase in voltage on the traction motors between steps is reduced, thereby reducing the tendency of the traction motors to slip since the voltage is increased in small increments.

In the modification of the invention illustrated in Figs. 3 and 4, an additional balancing transformer 55 is provided for the one group of motors 4M, 5M and 6M, thereby permitting this group of motors to be operated entirely independently of the other group if it is so desired. The balancing transformer 55 is provided with a winding 56 which is connected in parallel-circuit relation to the motors 5M and 6M and a winding 57 connected in parallel-circuit relation to the motor 4M. The transformer 55 functions to control the slipping of these motors in a manner similar to that explained hereinbefore.

Additional tap-changing switches 9 and 10 are also provided, thereby increasing the number of accelerating steps. It will be understood that further additional tap-changing switches may be utilized if desired, the number depending upon the number of accelerating steps required.

In the present scheme an auxiliary switch A is provided for changing the connections for the preventive coil 35 and an auxiliary switch C is provided for changing the connections of the preventive coil 36. Thus, by means of the switch A the one terminal of the preventive coil 35 may be connected to the bus 48 or to the bus 46. The other terminal of the preventive coil 35 is always connected to the bus 46. Likewise, by means of the switch C the one terminal of the preventive coil 36 may be connected to the bus 47 or the bus 45. The other terminal of the preventive coil 36 is permanently connected to the bus 45.

The sequence of operation of the tap-changing switches and the auxiliary switches A and C is shown in the sequence chart in Fig. 4. It is believed that the operation of these switches to increase the voltage applied to the motors will be clearly understood in view of the detailed explanation of the operation of the switches illustrated in Fig. 1. Therefore, it is thought unnecessary to describe the operation in more detail at this time.

In the modification of the invention illustrated in Figs. 5 and 6, two double throw auxiliary switches A and B are provided for the preventive coil 35 and two similar switches C and D are provided for the preventive coil 36. Thus, each one of these coils may be balanced at all times when they are energized by being connected to the taps of the main transformer. The present scheme has the additional advantage of requiring fewer taps on the main transformer for a predetermined number of accelerating steps, since two of the main tap-changing switches are connected to each one of the taps on the main transformer. In this manner the construction of the main transformer is simplified.

The operation of the tap-changing switches and the auxiliary switches is illustrated by the sequence chart in Fig. 6. In view of the detailed explanation of the operation of the switches shown in Fig. 1, it is believed unnecessary to include a detailed explanation of the operation of the present switches, since the principle of operation is the same.

It will be understood that the operation of the tap-changing switches and of the auxiliary switches in all of the schemes herein described may be controlled by a controller of a type well known in the art. Furthermore, the usual interlocking of the tap-changing switches may be provided for preventing improper operation of these switches.

In actual practice the single-pole double-throw auxiliary switches change from one position to the other so quickly that there is no effective sag-back in the voltage across the motors or in the draw-bar pull on the locomotive. In this country practically all alternating current locomotives operate on 25 cycle power. Hence, if the auxiliary switch requires no more time to change from one position to the other than given by the above frequency, there will be no draw-bar sag-back during one of the internotches.

From the foregoing description it is apparent that I have provided a control system which will not only reduce the tendency of the driving wheels of an electric locomotive to slip under adverse conditions but will also limit the speed of the motors in the event that slipping occurs, thereby preventing injury to the motors and other equipment on the locomotive.

Since many modifications may be made in the apparatus and arrangement of parts without departing from the spirit of my invention, I do not wish to be limited other than by the scope of the appended claims.

I claim as my invention:

1. In a control system, in combination, a main transformer, a motor energized from said transformer, a plurality of switches for changing taps on said transformer to vary the voltage on the motor, a plurality of said switches being connected to each tap on the transformer, a plurality of busses to which certain of said switches are connected, a plurality of preventive coils connected across certain of said busses, and a plurality of auxiliary switches for changing said preventive coil connections to said buses.

2. In a control system, in combination, a main transformer, a motor energized from said transformer, a plurality of switches for changing taps on said transformer to vary the voltage on the motor, a plurality of said switches being connected to each tap on the transformer, a plurality of busses to which certain of said switches are connected, a pair of preventive coils connected across certain of said busses, a plurality of auxiliary switches for changing said preventive coil connections to said buses, and a third preventive coil connected between the midpoints of said first-named preventive coils.

3. In a control system, in combination, a main transformer, a motor energized from said transformer, a plurality of switches for changing taps on said transformer to vary the voltage on the motor, a pair of said switches being connected to each tap on the transformer, a plurality of busses to which certain of said switches are connected, the switches of each pair being connected to a different bus, a pair of preventive coils connected across certain of said busses, and a plurality of auxiliary switches for changing said preventive coil connections to said buses.

4. In a control system, in combination, a main transformer, a motor energized from said transformer, a plurality of switches for changing taps on said transformer to vary the voltage on the motor, a pair of said switches being connected to each tap on the transformer, a plurality of busses to which certain of said switches are connected, the switches of each pair being connected to a different bus, a pair of preventive coils connected across certain of said busses, a plurality of auxiliary switches for changing said preventive coil connections to said buses, and a third preventive coil connected across the midpoints of said first-named preventive coils.

5. In a control system, in combination, a main transformer, a motor energized from said transformer, a plurality of switches for changing taps on said transformer to vary the voltage on the motor, a plurality of busses to which certain of said switches are connected, a pair of preventive coils connected across certain of said busses, a plurality of auxiliary switches for changing said preventive coil connections to said buses, and a third preventive coil connected between the midpoints of said first-named preventive coils.

6. In a control system, in combination, a main transformer, a motor energized from said transformer, a plurality of switches for changing taps on said transformer to vary the voltage on the motor, two pairs of busses to which certain of said switches are connected, a preventive coil connected across each pair of busses, a plurality of auxiliary switches for changing said preventive coil connections to said buses, and a third preventive coil connected across the midpoints of said first-named preventive coils.

7. In a control system, in combination, a main transformer, a motor energized from said transformer, a plurality of switches for changing taps on said transformer to vary the voltage on the motor, two pairs of busses to which certain of said switches are connected, a preventive coil connected across each pair of busses, a plurality of single-pole double-throw auxiliary switches for changing said preventive coil connections to said buses, and a third preventive coil connected across the midpoints of said first-named preventive coils.

8. In a control system, in combination, a main transformer, a motor energized from said transformer, a plurality of switches for changing taps on said transformer to vary the voltage on the motor, two pairs of busses to which certain of said switches are connected, a preventive coil connected across each pair of busses, a pair of auxiliary switches for changing the connections for one of said preventive coils from one of said buses to another, and a third preventive coil connected across the midpoints of the first-named preventive coils.

9. In a control system, in combination, a main transformer, a motor energized from said transformer, a plurality of switches for changing taps on said transformer to vary the voltage on the motor, two pairs of busses to which certain of said switches are connected, a preventive coil connected across each pair of busses, a double-throw auxiliary switch for changing the connections for each one of said preventive coils from one of said buses to another, and a third preventive coil connected across the mid-points of said first-named preventive coils.

10. In a control system, in combination, a main transformer, a motor energized from said transformer, a plurality of switches for changing taps on said transformer to vary the voltage on the motor, two pairs of busses to which certain of said switches are connected, a preventive coil connected across each pair of busses, a pair of double-throw auxiliary switches for changing the connections for each one of said preventive coils from one of said buses to another, and a third preventive coil connected across the midpoints of said first-named preventive coils.

11. In a control system, in combination, a main transformer, a plurality of motors connected in series-circuit relation, said motors being energized from said transformer, a plurality of switches for changing taps on said transformer to vary the voltage on the motors, a plurality of busses to which certain of said switches are connected, a pair of preventive coils connected across certain of said busses, a plurality of auxiliary switches for changing said preventive coil connections to said buses, a third preventive coil connected between the midpoints of said first-named preventive coils, and a balancing transformer connected across said motors.

LLOYD J. HIBBARD.